(12) United States Patent  (10) Patent No.: US 8,243,452 B2
Yang et al.  (45) Date of Patent: Aug. 14, 2012

(54) FIXING MECHANISM AND ELECTRONIC DEVICE UTILIZING THE SAME

(75) Inventors: Xin Yang, Shenzhen (CN); Wei Wu, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 164 days.

(21) Appl. No.: 12/869,701

(22) Filed: Aug. 26, 2010

(65) Prior Publication Data

US 2011/0261534 A1    Oct. 27, 2011

(30) Foreign Application Priority Data

Apr. 21, 2010   (CN) .......................... 2010 1 0152275

(51) Int. Cl.
H05K 7/20 (2006.01)
(52) U.S. Cl. .................. 361/710; 361/679.33; 361/707; 361/715; 361/728; 248/633; 165/80.1
(58) Field of Classification Search ............ 361/679.33, 361/679.57, 679.58, 704, 707, 709, 710, 361/715, 728
See application file for complete search history.

(56) References Cited

U.S. PATENT DOCUMENTS

| | | | | |
|---|---|---|---|---|
| 6,480,387 B1* | 11/2002 | Lee et al. | ...... | 361/704 |
| 6,798,656 B1* | 9/2004 | Lin | ...... | 361/690 |
| 7,126,823 B2* | 10/2006 | Chen et al. | ...... | 361/702 |
| 7,242,552 B2* | 7/2007 | Kudo et al. | ...... | 360/97.12 |
| 7,262,969 B2* | 8/2007 | Lee et al. | ...... | 361/704 |
| 7,349,218 B2* | 3/2008 | Lu et al. | ...... | 361/679.32 |
| 7,505,274 B2* | 3/2009 | Yu | ...... | 361/710 |
| 7,619,890 B2* | 11/2009 | Tseng et al. | ...... | 361/700 |
| 7,990,722 B2* | 8/2011 | Cao et al. | ...... | 361/721 |
| 8,139,360 B2* | 3/2012 | Wu | ...... | 361/710 |
| 2003/0193778 A1* | 10/2003 | Staiano | ...... | 361/687 |
| 2004/0047130 A1* | 3/2004 | Liu | ...... | 361/704 |
| 2006/0007659 A1* | 1/2006 | Lee et al. | ...... | 361/704 |
| 2008/0302622 A1* | 12/2008 | Ohtake et al. | ...... | 188/379 |
| 2011/0069444 A1* | 3/2011 | Nakamura et al. | ...... | 361/679.37 |

* cited by examiner

*Primary Examiner* — Courtney Smith
(74) *Attorney, Agent, or Firm* — Altis Law Group, Inc.

(57) ABSTRACT

A fixing mechanism for fixing an object to a base plate is provided. The object defines a hole and includes a ring extending from an edge of the hole. The ring includes a threaded hole. The base plate includes a post on its top surface and respectively opposing to the hole. The fixing mechanism includes an elastic element, a first hollow bolt and a second bolt. The first hollow bolt passes through the hole and the elastic element, and includes an externally threaded portion engaging with the threaded hole of the ring. The second bolt is inserted into the first hollow bolt, and engages with the post of the base plate.

18 Claims, 6 Drawing Sheets

FIXING MECHANISM AND ELECTRONIC DEVICE UTILIZING THE SAME

BACKGROUND

1. Technical Field

The present disclosure relates to fixing mechanisms and, particularly, to an electronic device including components which can be fixed together by the fixing mechanism.

2. Description of Related Art

An electronic component such as a hard disk is usually mounted on posts of a supporting panel with screws or bolts. When the supporting panel is moved relative to the electronic component, heads of the screws or bolts may scrape the electronic component.

DETAILED DESCRIPTION

The disclosure, including the accompanying, is illustrated by way of example and not by way of limitation. It should be noted that references to "an" or "one" embodiment in this disclosure are not necessarily to the same embodiment, and such references mean at least one.

Figure 1:
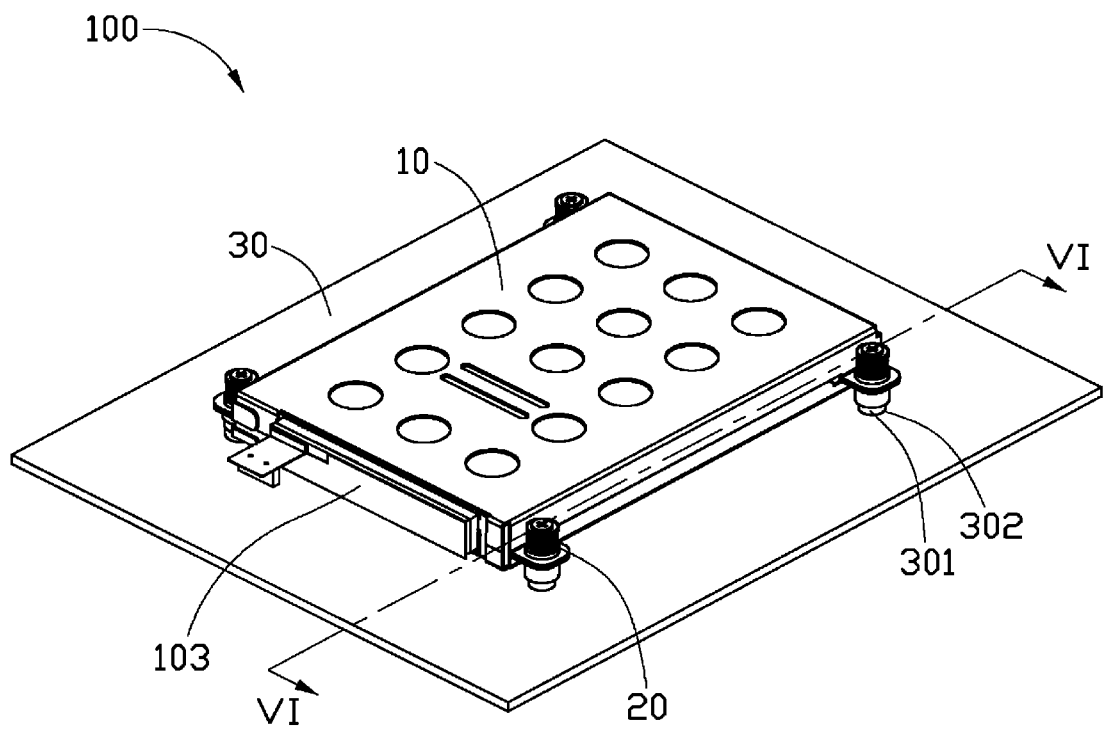
FIG. 1 is an isometric view of an electronic device in accordance with an exemplary embodiment, showing a device, a base plate, and a fixing mechanism.

Referring to FIG. 1, an embodiment of electronic device 100 is illustrated. The electronic device 100 includes a device 10, a base plate 30, and a number of fixing mechanisms 20 for fixing the device 10 on the base plate 30.

Figure 2:
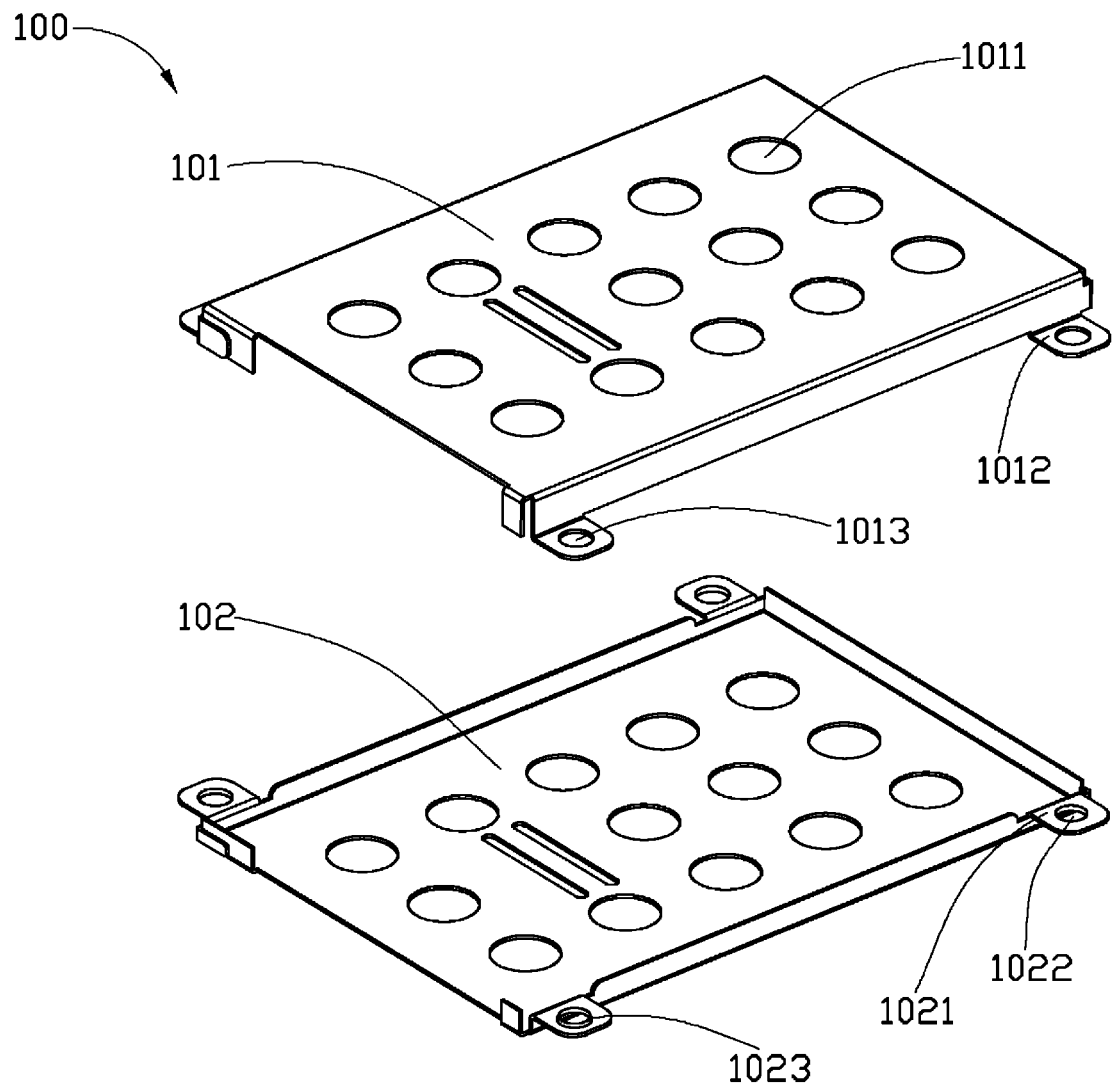
FIG. 2 is a partial, exploded view of the electronic device of FIG. 1.
Figure 3:
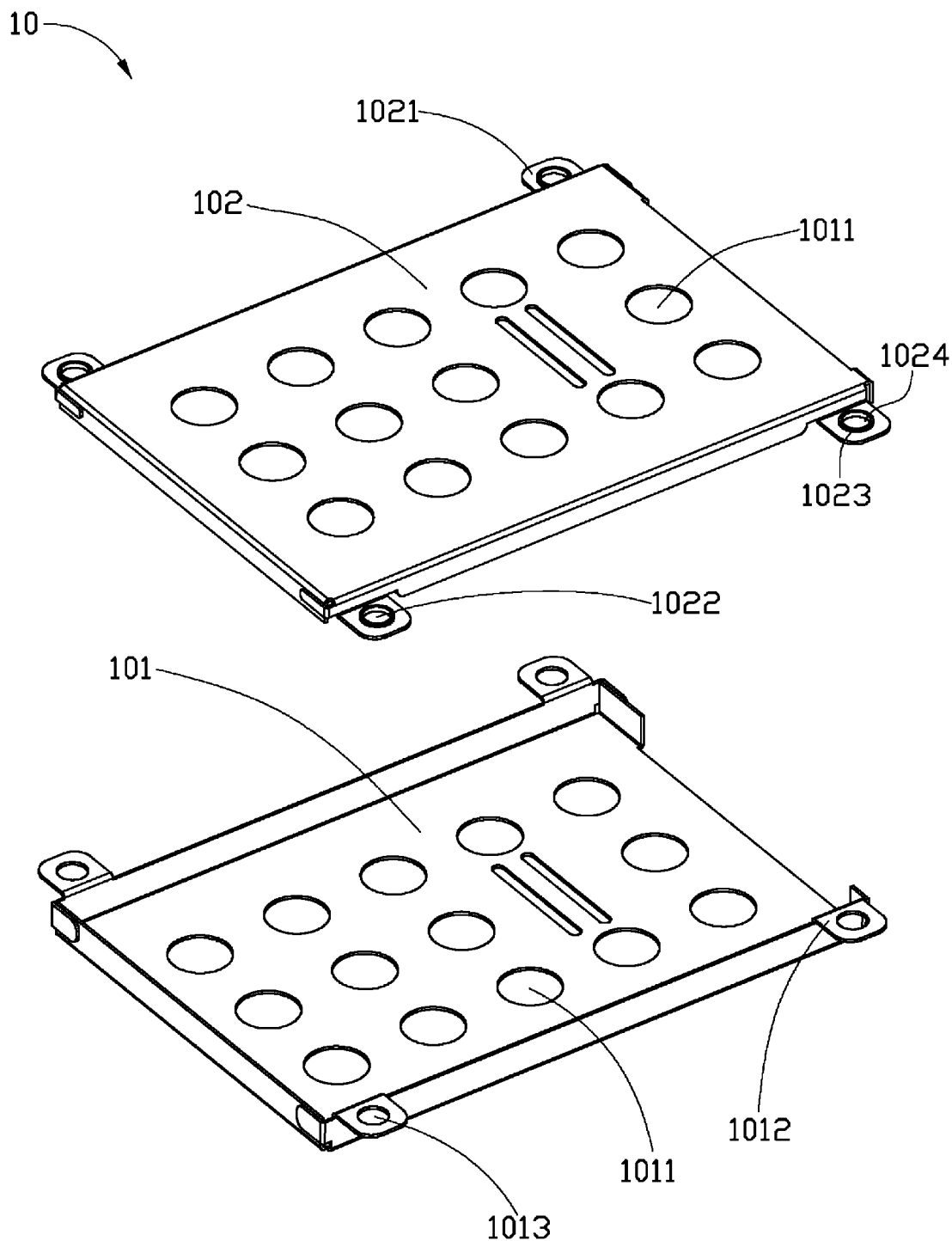
FIG. 3 is similar to FIG. 2, but viewed from a different aspect.

Referring to FIGS. 2-3, the device 10 includes a base 102 and a cover 101. An electronic component 103 is received between the base 102 and the cover 101. In one embodiment, the electronic component 103 is a hard disk. The base 102 includes two pairs of tabs 1021 extending from opposite sides thereof along a widthwise direction of the base 102. The cover 101 includes two pairs of coupling tabs 1012 extending from opposite sides thereof along a widthwise direction of the cover 101. Each tab 1021 abuts against one coupling tab 1012. Each tab 1021 defines a hole 1022, and each coupling tabs 1012 defines a hole 1013 opposing the hole 1022. A ring 1023 extends from an edge of the hole 1022 away from the cover 101, and includes a threaded hole 1024. The base 102 and the cover 101 further respectively include a number of through holes 1011 for dissipating heat of the electronic component 103.

The base plate 30 includes four posts 301 on its top surface and respectively opposing the four holes 1022 and holes 1013. Each post 301 defines a threaded hole 302.

Figure 4:
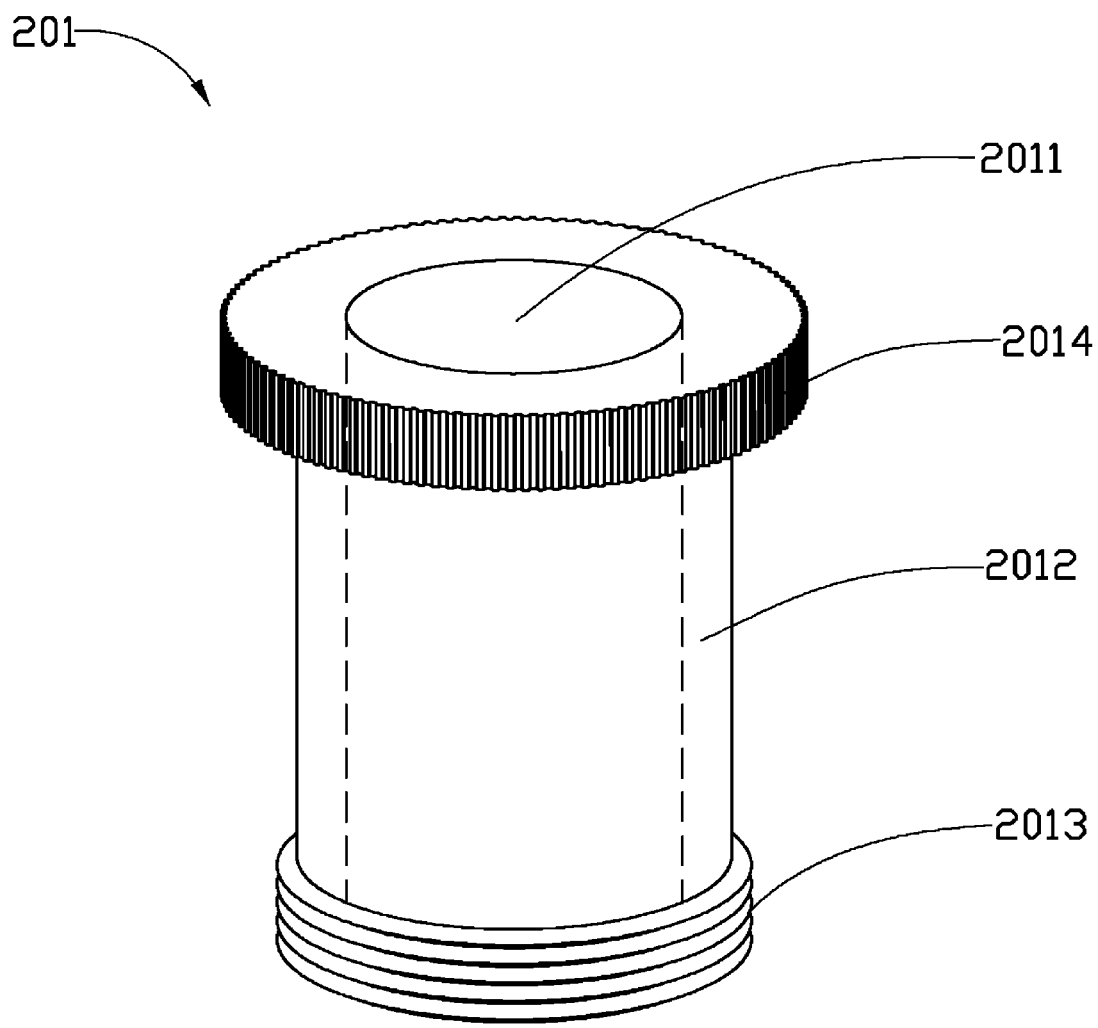
FIG. 4 is an enlarged view of a first hollow bolt of the fixing mechanism of FIG. 2.
Figure 5:
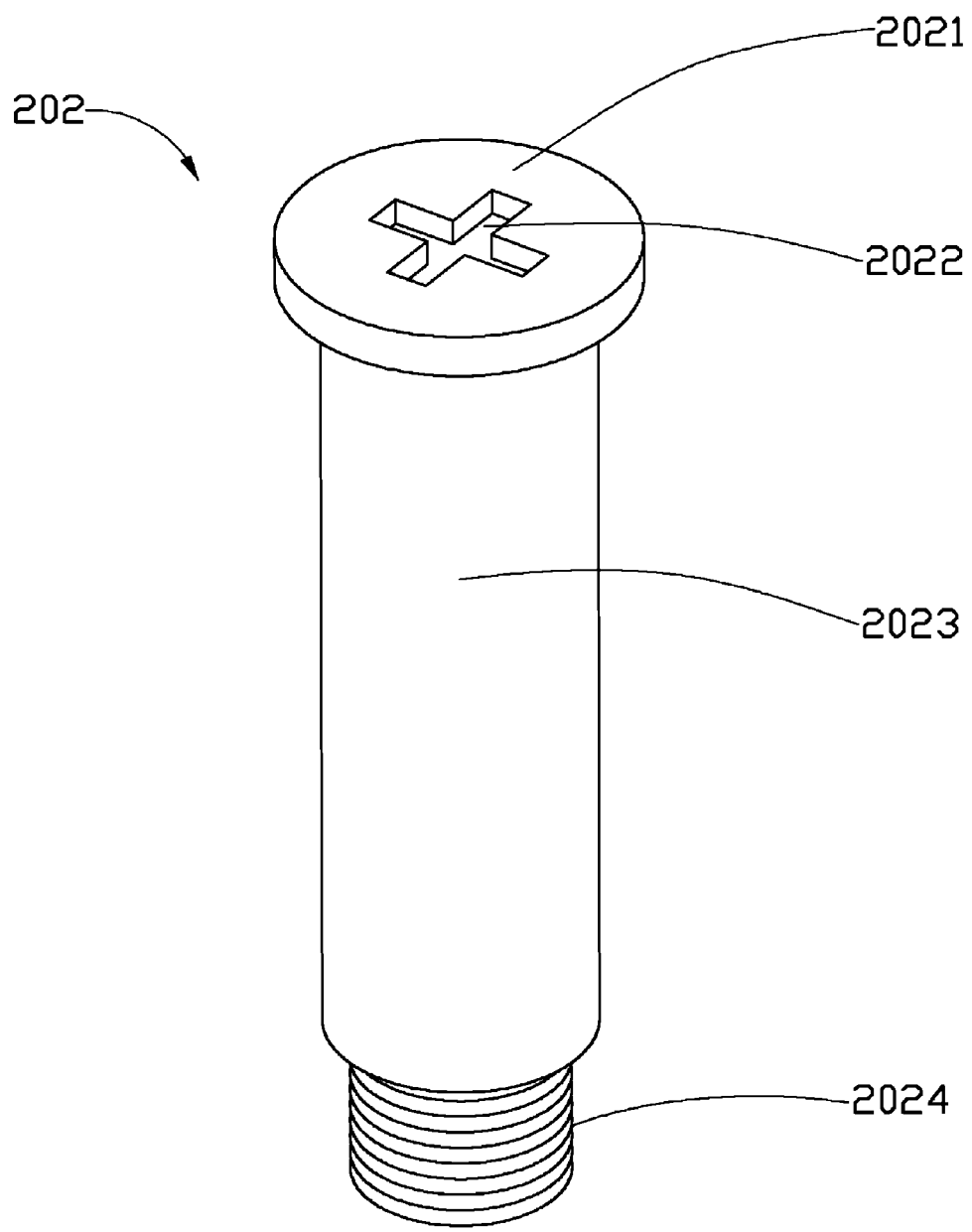
FIG. 5 is an enlarged view of a second bolt of the fixing mechanism of FIG. 2.
Figure 6:
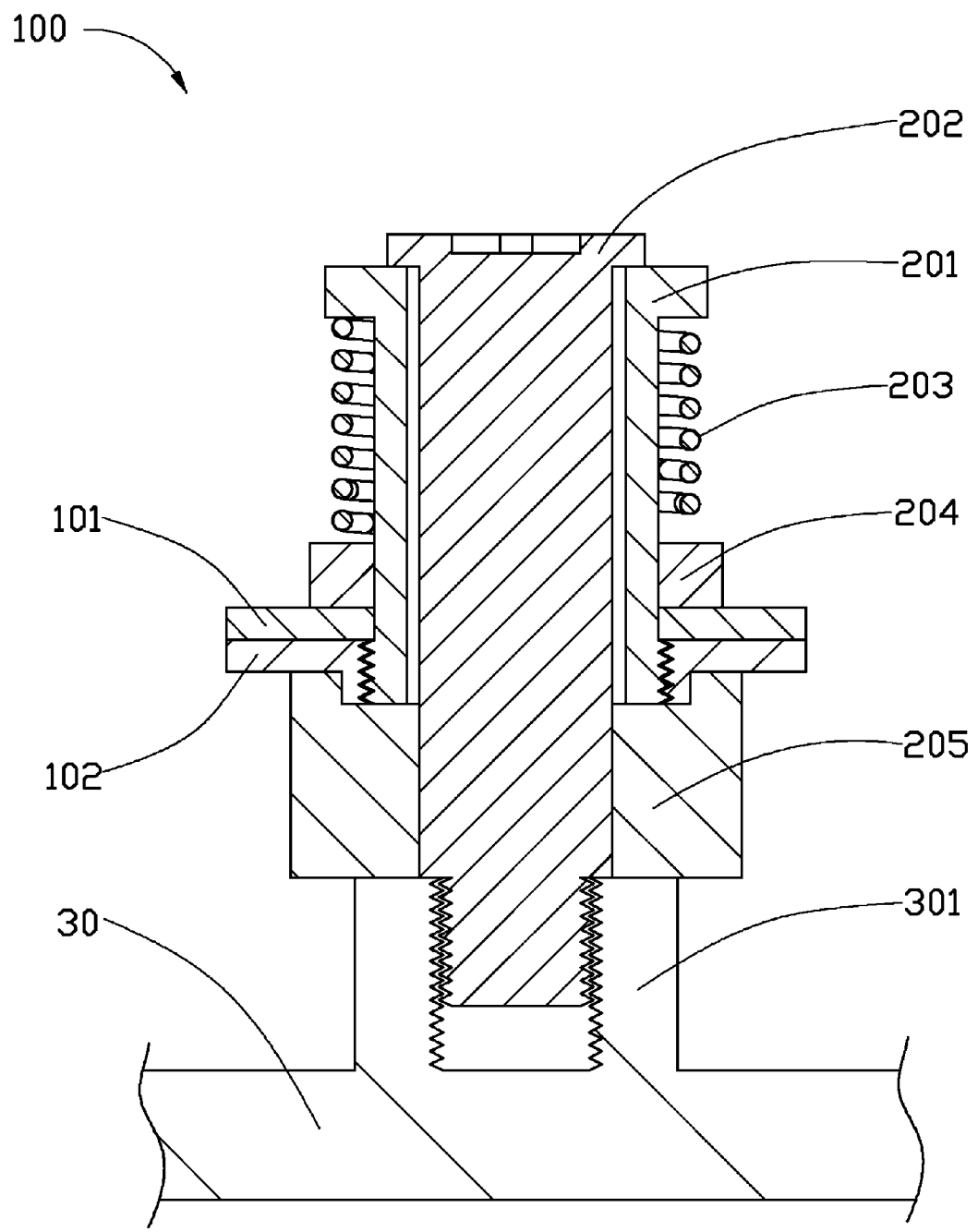
FIG. 6 is a partial, cross-sectional view of the electronic device of FIG. 1, taken along the line VI-VI in FIG. 1.

Referring to FIGS. 4-6, each fixing mechanism 20 includes a first hollow bolt 201, a second bolt 202, an elastic element 203, a first buffer element 204, and a second buffer element 205.

The first hollow bolt 201 includes a rod 2012, a head 2014 protruding from a lateral surface of one end of the rod 2012, and an externally threaded portion 2013 protruding from the lateral surface of an opposite end of the rod 2012. A through passage 2011 is defined in the rod 2012 from the head 2014 to the opposite end with the threaded portion 2013.

The second bolt 202 is inserted into the first hollow bolt 201 through the passage 2011. The second bolt 202 includes a rod 2023, an externally threaded portion 2024 extending from one end of the rod 2023, and a head 2021 extending from an opposite end of the rod 2023. A drive 2022 is defined in a top surface of the head 2021. In one embodiment, the drive 2022 is cross shaped to allow a hand tool (i.e. screwdriver) to rotate the second bolt 202. The diameter of the passage 2011 is less than that of the head 2021 of the second bolt 202, thereby preventing the second bolt 202 from passing through the first hollow bolt 201.

The elastic element 203 is arranged around the first hollow bolt 201. The first buffer element 204 is arranged around the first hollow bolt 201 between the elastic element 203 and the device 10 when the first hollow bolt 201 passes through the holes 1013 and 1022. The second buffer element 205 is arranged around the second bolt 202 between the device 10 and the base plate 30 when the second bolt 202 passes through the first hollow bolt 201 to contact the base plate 30. In one embodiment, the elastic element 203 is a coil spring. The first buffer 204 and the second buffer element 205 are washers made of shock absorbing material, such as rubber. In other embodiments, the first buffer 204 and the second buffer element 205 may be coil springs or sponge holders, etc.

When assembling, the elastic element 203 and the first buffer element 204 are arranged around the rod 2012 of the first hollow bolt 201 in turn. The four first hollow bolts 201 respectively pass through the four holes 1013 until the four externally threaded portions 2013 respectively engage with the threaded holes 1024 of the rings 1023. The four second bolts 202 are respectively inserted into the four passages 2011 of the four first hollow bolts 201 until portions of the four rods 2023 of the second bolts 202 respectively pass through the four holes 1022 of the base 102. The four second buffer elements 205 are respectively arranged around the portions of the rods 2023 which pass through the four holes 1022. Then, the four second bolts 202 are respectively continuously pressed by an external force until the four heads 2021 of the second bolts 202 contact the heads 2014 of the first hollow bolt 201. The four second bolts 202 are driven to rotate by an external force applied to the second four drives 2022 until the four externally threaded portions 2024 respectively engage with the four threaded holes 302 of the four posts 301 of the base plate 30, thereby fixing the device 10 on the base plate 30.

When the electronic device 100 is moved, the four elastic elements 203, the four first buffer elements 203 and the four second buffer elements 205 can dampen vibrations that might otherwise cause damaging movement between the electronic component 103 and the electronic device 100.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A fixing mechanism for fixing an object to a base plate, the object defining a hole and comprising a ring extending from an edge of the hole, the ring comprising a threaded hole, the base plate comprising a post on its top surface and respectively opposing to the hole, the post defining a threaded hole; the fixing mechanism comprising:
an elastic element;
a first hollow bolt passing through the hole and the elastic element, and comprising an externally threaded portion engaging with the threaded hole of the ring; and
a second bolt inserted into the first hollow bolt, and engaging with the threaded hole of the post of the base plate.

2. The fixing mechanism as described in claim 1, further comprising a first buffer element, wherein the first buffer element is arranged around the first hollow bolt between the elastic element and the object when the first hollow bolt passes thought the hole.

3. The fixing mechanism as described in claim 2, further comprising a second buffer element, wherein the second buffer element is arranged around the second bolt between the object and the base plate.

4. The fixing mechanism as described in claim 3, wherein the first buffer element and the second buffer element are washers.

5. The fixing mechanism as described in claim 1, wherein the elastic element is a coil spring.

6. The fixing mechanism as described in claim 1, wherein the first hollow bolt further comprises a rod, and a head protruding from a lateral surface of one end of the rod, the externally threaded portion protrudes from the lateral surface of an opposite end of the rod, a through passage is defined in the rod along a lengthwise direction, the second bolt is inserted into the first hollow bolt through the passage.

7. The fixing mechanism as described in claim 6, wherein the second bolt comprises a rod, an externally threaded portion extending from one end of the rod, and a head extending from an opposite end of the rod, a drive is defined in a top surface of the head of the second bolt, the second bolt is inserted into the first hollow bolt until the head of the second bolt is resisted by the head of the first hollow bolt, the second bolt is driven to rotate through an external force applied to the drive until the externally threaded portion engages with the threaded hole of post of the base plate.

8. The fixing mechanism as described in claim 7, wherein the diameter of the passage is less than that of the head of the second bolt.

9. An electronic device comprising:
a device configured for receiving an electronic component, and defining a plurality of holes and comprising a plurality of rings extending from an edge of one of the plurality of holes, each of the plurality of the rings comprising a threaded hole;
a base plate comprising a plurality of posts mounted on its top surface and respectively opposing to the plurality of holes, each of the plurality of posts defining a threaded hole; and
a plurality of fixing mechanisms fixing the device to the base plate; and each of the plurality of fixing mechanisms comprising:
an elastic element;
a first hollow bolt passing through one of the plurality of the holes and the elastic element, and comprising an externally threaded portion engaging with one of the plurality of the threaded holes of the rings of the device; and
a second bolt inserted into the first hollow bolt, and engaging with one of the plurality of the threaded holes of the posts of the base plate.

10. The electronic device as described in claim 9, wherein each of the plurality of fixing mechanisms comprises a first buffer element, wherein the first buffer element is arranged around the first hollow bolt between the elastic element and the device when the first hollow bolt passes thought one of the plurality of the holes.

11. The electronic device as described in claim 10, wherein each of the plurality of fixing mechanisms further comprises a second buffer element, the second buffer element is arranged around the second bolt between the device and the base plate.

12. The electronic device as described in claim 11, wherein the first buffer element and the second buffer element are washers.

13. The electronic device as described in claim 9, wherein the elastic element is a coil spring.

14. The electronic device as described in claim 9, wherein each first hollow bolt further comprises a rod, and a head protruding from a lateral surface of one end of the rod, the externally threaded portion protrudes from the lateral surface of an opposite end of the rod, a through passage is defined in the rod along a lengthwise direction, the second bolt is inserted into the first hollow bolt through the passage.

15. The electronic device as described in 14, wherein each second bolt comprises a rod, an externally threaded portion extending from one end of the rod, and a head extending from an opposite end of the rod, a drive is defined in a top surface of the head of the second bolt, the second bolt is inserted into the first hollow bolt until the head of the second bolt is resisted by the head of the first hollow bolt, the second bolt is driven to rotate through an external force applied to the drive until the externally threaded portion engages with one of the plurality of threaded holes of the posts of the base plate.

16. The electronic device as described in claim 15, wherein the diameter of the passage is less than that of the head of the second bolt, thereby preventing the second bolt from passing through the first hollow bolt.

17. The electronic device as described in claim 9, wherein the device further comprises a cover and a base, the electronic component is received between the cover and the base, the cover and the lower respectively comprises an least a pair of tabs extending from opposite sides along a widthwise direction of the base, the plurality of the holes are respectively defined in the tabs.

18. The electronic device as described in claim 17, wherein the cover and the base further respectively comprises a plurality of through holes for dissipating heat of the electronic component.

* * * * *